(12) United States Patent
Lau et al.

(10) Patent No.: US 6,462,588 B2
(45) Date of Patent: *Oct. 8, 2002

(54) ASYMMETRY CONTROL FOR AN OUTPUT DRIVER

(75) Inventors: Benedict Chung-Kwong Lau; Huy M. Nguyen, both of San Jose, CA (US)

(73) Assignee: Rambus, Inc., Los Altos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,238

(22) Filed: Apr. 3, 2000

(65) Prior Publication Data

US 2002/0050844 A1 May 2, 2002

(51) Int. Cl.[7] ................................................. H03B 1/00
(52) U.S. Cl. ................... 327/108; 327/77; 327/307; 327/379; 326/30; 326/82; 326/26; 330/9
(58) Field of Search ....................... 327/108–112, 89, 327/56, 379, 77, 78, 407, 408, 530, 307, 538, 540, 541, 543; 333/5; 326/30–34, 82, 83, 86, 90, 112, 113, 115, 119; 323/313, 317; 330/9

(56) References Cited

U.S. PATENT DOCUMENTS

| 4,933,643 A | * | 6/1990 | Jandu et al. | 330/9 |
|---|---|---|---|---|
| 5,550,496 A | * | 8/1996 | Desroches | 327/108 |
| 5,812,005 A | * | 9/1998 | Ezell et al. | 327/307 |
| 5,864,254 A | * | 1/1999 | Tashiro | 327/65 |
| 5,878,082 A | * | 3/1999 | Kishigami | 326/82 |
| 6,025,742 A | * | 2/2000 | Chan | 327/108 |
| 6,028,468 A | * | 2/2000 | Menniti et al. | 327/333 |
| 6,064,224 A | * | 5/2000 | Esch, Jr. et al. | 326/30 |
| 6,087,847 A | * | 7/2000 | Mooney et al. | 326/30 |
| 6,094,075 A | * | 7/2000 | Garrett, Jr. et al. | 327/108 |
| 6,252,454 B1 | * | 6/2001 | Thompson et al. | 330/9 |

* cited by examiner

*Primary Examiner*—Terry D. Cunningham
*Assistant Examiner*—Long Nguyen
(74) *Attorney, Agent, or Firm*—Lee & Hayes, PLLC

(57) ABSTRACT

A circuit for controlling signal levels on a transmission channel includes a comparator having a reference voltage input and a current control voltage input. A voltage divider is coupled to the current control voltage input of the comparator. The voltage divider includes multiple loads to divide voltages associated with a first output driver and a second output driver. The voltage divider also includes multiple switches to activate and deactivate loads in the voltage divider. A current control circuit is coupled to an output of the comparator. The current control circuit controls signal levels on the transmission channel in response to an output signal received from the comparator. Another circuit for controlling signal levels on a transmission channel includes a comparator that has a reference voltage input, a current control voltage input, and an offset control input. The offset control input is used to adjust the voltage offset on the transmission channel. A voltage divider is coupled to the current control voltage input of the comparator. The voltage divider divides voltages associated with a first output driver and a second output driver.

22 Claims, 4 Drawing Sheets

ASYMMETRY CONTROL FOR AN OUTPUT DRIVER

TECHNICAL FIELD

The present invention relates to a circuit used with a high-speed bus and, more particularly, to a method and circuit that provides for asymmetric control of an output driver for purposes of calibration.

BACKGROUND

To permit a rapid switching speed on a bus with low signal to noise ratio and good signal integrity, it is desirable for a current mode driver to set and control the current at which the driver operates. An existing system for setting and maintaining the operating current of a current mode driver is designed for use with a master-slave bus architecture. With such a bus architecture, two problems need to be solved to set the correct operating current on the bus: properly set the operating current of the master's current mode drivers, and properly set the operating current of the slave's current mode drivers. The current level of the drivers are initially set and periodically updated to compensate for the voltage offset due to process, voltage, and temperature variations by circuitry in the master and slave devices. The calibrated current mode driver can thus be used on a bus signaling system with multiple transmission lines and current mode drivers. A current control mechanism typically evaluates various voltage levels and increments or decrements a current control counter accordingly to set an appropriate output level.

FIG. 1 illustrates a current calibration mechanism using two of the output drivers and transmission lines on the signal bus. In a first portion of the circuit, a terminating resistor 102 is coupled between a terminating voltage (Vterm) and a bus conductor 104 which includes a matched impedance transmission line on a printed circuit board, an integrated circuit package and a socket. A pad 106 is coupled to bus conductor 104. Pad 106 is, for example, a conductive pad located on the silicon of the integrated circuit package. Similarly, bus conductor 104 may be a conductor, such as a trace, located on a printed circuit board. An output driver 108 is coupled to pad 106 and to ground. Output driver 108 is off as indicated by the logic "0" applied to the driver. A pass gate 110 is coupled between pad 106 and a resistor 112, to enable the current calibration process. Resistor 112 is also coupled to a voltage comparator 114, which is coupled to a current control circuit 116. Comparator 114 and current control circuit 116 are used to perform current control functions.

A second portion of the circuit shown in FIG. 1 includes a terminating resistor 118 coupled between a terminating voltage (Vterm) and a bus conductor 120. A pad 122 is coupled to bus conductor 120 and an output driver 124. Output driver 124 is on as indicated by the logic "1" applied to the driver, which causes a current flow, indicated by Iol, through the output driver to ground. A pass gate 126 is coupled between pad 122 and a resistor 128 to enable the current calibration process. Resistor 128 is also coupled to resistor 112 and comparator 114. Resistors 112 and 128 function as a voltage divider. The adjusted result of the current control circuit 116 is then fed back to the output drivers 108 and 124 to update the output current of the drivers.

In many instances, it is desirable for the circuit of FIG. 1 to balance (i.e., match) the voltage swing such that the voltage amplitude above Vref is equal to the amplitude below Vref. Additionally, during the calibration process, the circuit of FIG. 1 balances the voltages present in the two different parts of the circuit, such as the voltages indicated by Voh and Vol. When Rh (resistor 112) equals R1 (resistor 128), the circuit balances the voltage such that a midpoint voltage, Vmid, located between the two bus conductors 104 and 120 is approximately midway between the two voltages Voh and Vol. This midpoint voltage, Vmid, is provided to comparator 114 along with a fixed reference voltage, Vref. The output of comparator 114 represents a digital state of the difference between Vmid and Vref. If Vmid is higher than Vref, a logic signal output of 1 is generated to indicate more current is required. If Vmid is lower than Vref, a logic signal output of 0 is generated to indicate less current is required. If Vmid and Vref are equal (the circuit is "balanced"), then the output of comparator 114 will toggle between 1 and 0, indicating no difference between the two voltages. In this situation, the current will be toggling between two levels on opposite sides of the balanced level. Thus, the current flowing through output driver 124 is adjusted until:

$$\frac{Voh + Vol}{2} = Vmid \text{ (which equals Vref)}$$

which indicates that the voltages are balanced (i.e., Vref is midway between Voh and Vol).

Balancing the voltages as described above is desirable if the noise and voltage characteristics are the same for both logic states of the transmitted signal (voltage high for logic state 0 and voltage low for logic state 1). Balancing is further desirable if both signal voltage levels have similar noise characteristics or receive other similar effects from other sources (such as inductive ringing). If the noise or other source affects each signal voltage level in approximately the same manner, the circuit continues to balance the two voltage amplitudes (high and low) and the comparator generates the correct value.

However, in other situations, one signal voltage level may receive a noise profile that is not present on the other signal voltage level, or one signal voltage level may receive a stronger noise signal (i.e., higher voltage) than the other signal level. In this situation, a circuit that balances the two voltages of the type discussed above may not function properly because the noise signal is not balanced. Similarly, other forces, such as inductive ringing or voltage attenuation, may affect one signal level more than the second signal level, thereby causing improper operation when used with a circuit that balances the high and low amplitude at the source of the signal transmission line.

An improved circuit described herein addresses these and other problems by allowing for the offset of voltages between the output high voltage and the output low voltage to compensate for unequal noise or other forces affecting the signals on the signal transmission lines.

SUMMARY

The circuit discussed below allows the offsetting of two voltages: an output voltage high (Voh) and an output voltage low (Vol) with respect to a reference voltage Vref. The calibrated current mode driver can be replicated for all signals within the transmission signal bus to compensate for differences in the voltages on the transmission lines caused by voltage disturbances, such as noise, on the transmission lines and Vterm, and asymmetric changes in voltage amplitude due to voltage attenuation.

In one embodiment, a circuit to control signal levels on a transmission channel includes a comparator having a reference voltage input and a current control voltage input. A voltage divider is coupled to the current control voltage input of the comparator. The voltage divider includes multiple loads to divide voltages associated with a first output driver and a second output driver. The voltage divider also includes multiple switches to activate and deactivate associated loads in the voltage divider. A current control circuit is coupled to an output of the comparator. The current control circuit controls signal levels on the transmission channel in response to an output signal received from the comparator.

In another embodiment, a circuit to control signal levels on a transmission channel includes a comparator having a reference voltage input, a current control voltage input, and an offset control input. The offset control input adjusts the voltage offset on the transmission channel. A voltage divider is coupled to the current control voltage input of the comparator. The voltage divider divides voltages associated with a first output driver and a second output driver. A current control circuit is coupled to an output of the comparator. The current control circuit is configured to control signal levels on the transmission channel in response to an output signal received from the comparator.

DETAILED DESCRIPTION

The disclosure of a co-pending patent application entitled "Current Control Technique", Ser. No. 09/141,675, filed Aug. 27, 1998, is incorporated by reference herein.

An improved output driver circuit is discussed herein that allows the offsetting of the low output voltage (Vol) to compensate for differences in the voltages on the transmission lines caused by, for example, different noise levels present in the voltage levels. This offsetting of the low output is also referred to as the asymmetric control of the output driver. Two different circuits are discussed herein, each of which provide asymmetric control of an output driver for purposes of calibration of the output driver.

The circuits described herein can be applied to any pair of transmission lines in a bus or other collection of signal lines (also referred to as a transmission channel). The particular circuits described herein illustrate various resistors to perform, for example, voltage divider functions. In alternate embodiments, other types of load devices can be used to divide voltages. Further, pass gates are illustrated as an example of a switch for controlling the flow of current in the circuit. In alternate embodiments, other types of switching devices are used to implement the circuits described herein.

Figure 1:
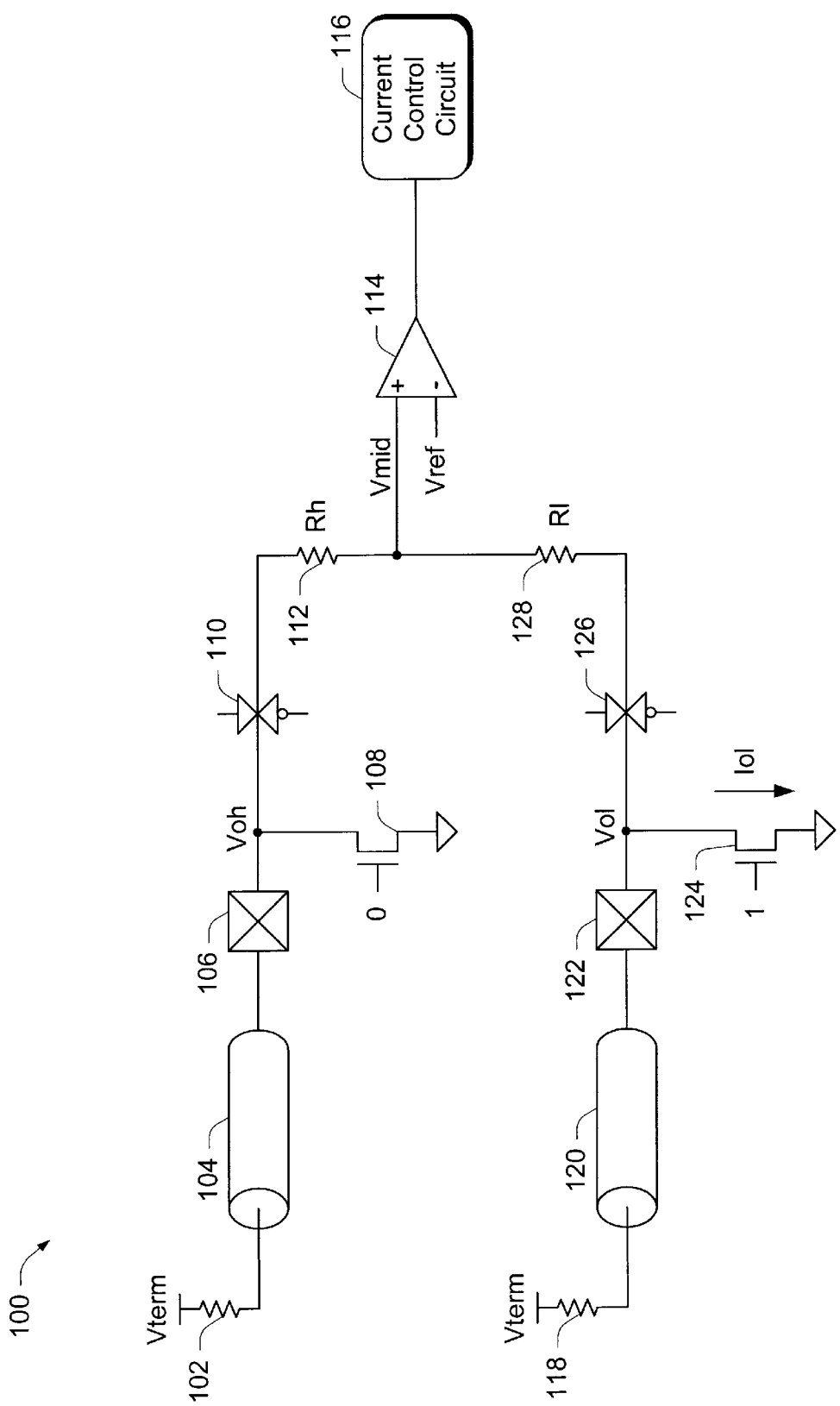
FIG. 1 illustrates a current control circuit that compares two voltage level generated from two different output drivers and two different signal transmission lines.
Figure 2:
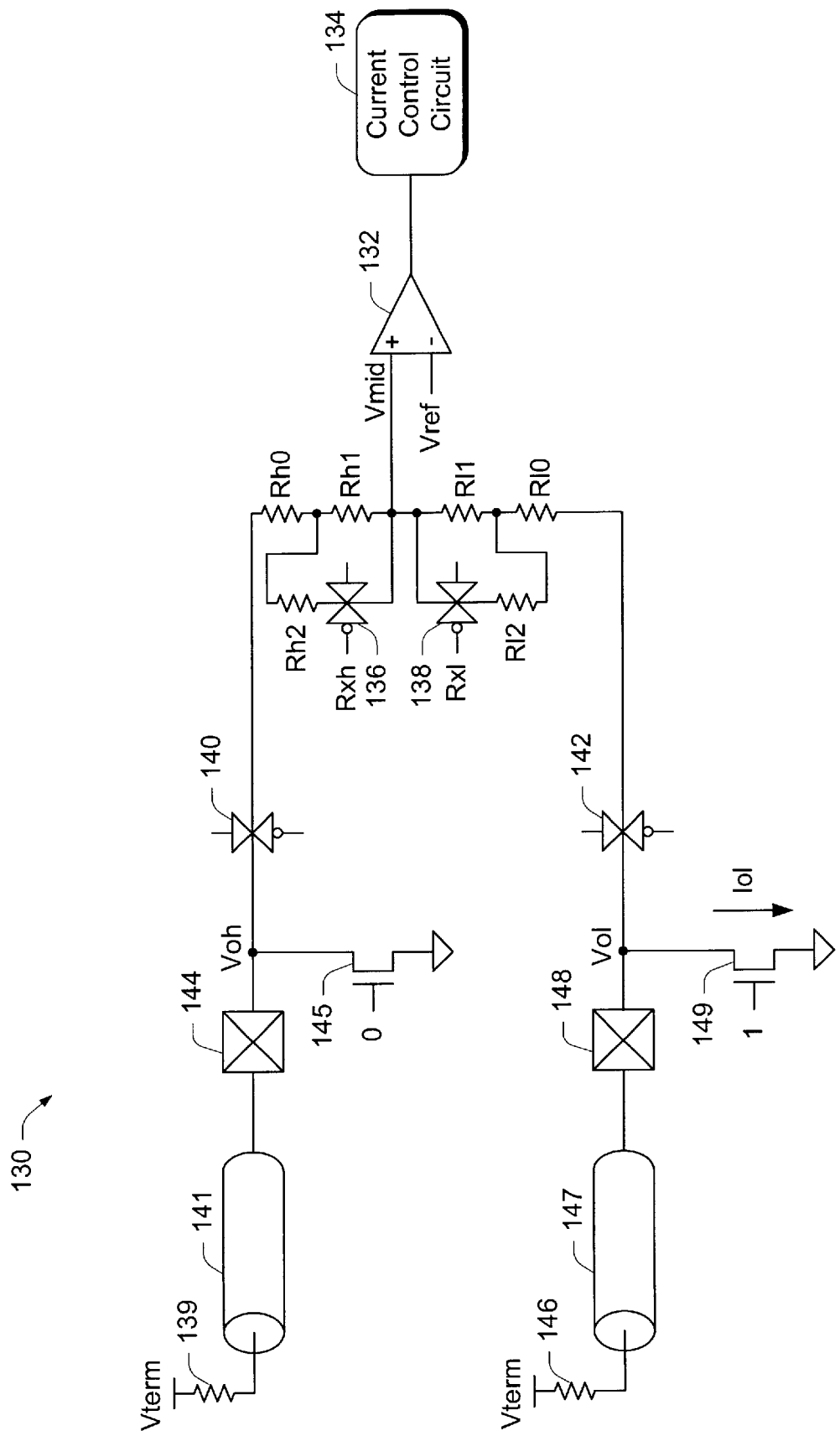
FIG. 2 illustrates an exemplary current control circuit capable of offsetting the voltages on two different signal transmission lines.

FIG. 2 illustrates an exemplary output driver circuit 130 capable of offsetting the voltages on two different signal transmission lines, thereby allowing for the adjustment of differences in the voltages on the signal transmission lines. The circuit of FIG. 2 is similar to FIG. 1 with respect to the terminating resistors 139 and 146, bus conductors 141 and 147, pads 144 and 148, output drivers 145 and 149, and pass gates 140 and 142. However, several additional resistors and an additional pair of pass gates 136 and 138 are located near an input to a voltage comparator 132. The output of voltage comparator 132 is coupled to a current control circuit 134. Voltage comparator 132 receives Vref and Vmid signals as inputs, similar to the circuit discussed above with respect to FIG. 1. However, the circuit of FIG. 2 allows for the offset of Vmid to compensate for unequal noise in the two signal voltage levels or other unequal voltage disturbances in the signal level.

Resistors Rh0 and Rh1 are coupled in series between the comparator 132 and pass gate 140. Similarly, resistors R10 and R11 are coupled in series between the comparator 132 and pass gate 142. Another resistor Rh 2 and pass gate 136 are coupled in parallel with resistor Rh1. Similarly, a resistor R12 and pass gate 138 are coupled in parallel with resistor R11. The six resistors Rh0, Rh1, Rh 2, R10, R11, and R12 form a voltage divider circuit that is capable of offsetting Vol by a desired "offset level." Thus, the six resistors provide for the control of the asymmetry in the output driver.

Pass gate 136 determines whether resistor Rh 2 is activated (i.e., whether current is permitted to flow through resistor Rh 2 such that the resistor is an active part of the voltage divider circuit). Pass gate 136 is controlled by a signal "Rxh". Similarly, pass gate 138 determines whether resistor R 12 is activated (i.e., is an active part of the voltage divider circuit). Pass gate 138 is controlled by a signal "Rxl". Thus, by controlling the activation of resistors Rh2 and R12, the circuit is able to control the asymmetry of the output driver. The circuit shown in FIG. 2 contains two separate switchable resistance branches, controlled by pass gates 136 and 138. Alternate embodiments of the circuit my contain additional switchable resistance branches to provide additional levels of offset control.

Figure 3:
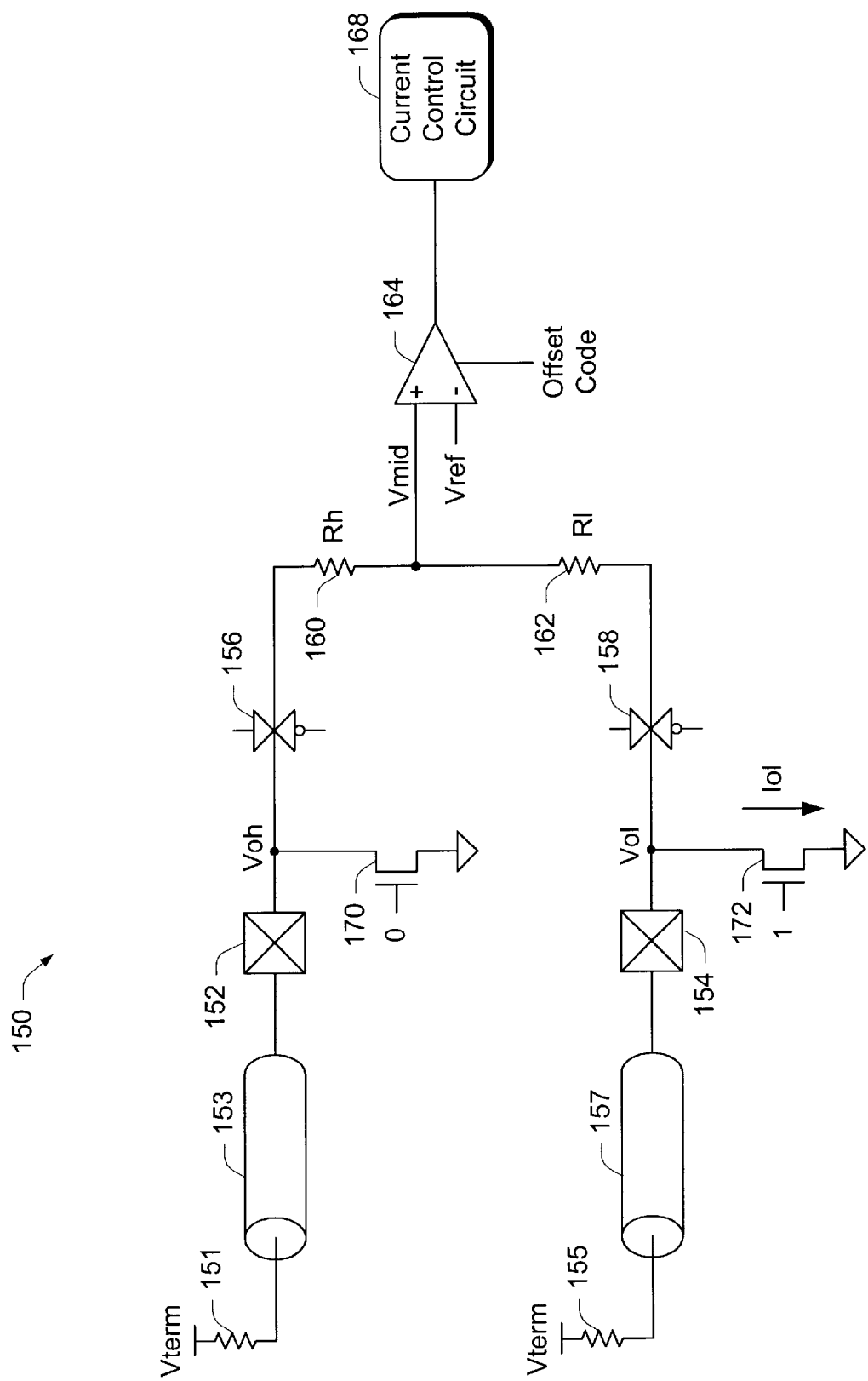
FIG. 3 illustrates another example of a current control circuit capable of offsetting the voltages on two different signal transmission lines.

FIG. 3 illustrates another example of an output driver circuit 150 capable of offsetting the voltages on two different signal transmission lines. The circuit of FIG. 3 is similar to FIG. 1 with respect to the terminating resistors 151 and 155, bus conductors 153 and 157, pads 152 and 154, output drivers 170 and 172, and pass gates 156 and 158, and a pair of resistors 160 and 162 that create a voltage divider. A voltage comparator 164 receives a Vref signal and a Vmid signal (generated by the voltage divider circuit formed by resistors 160 and 162 ). The output of voltage comparator 164 is coupled to a current control circuit 168.

Voltage comparator 164 differs from voltage comparator 114 in FIG. 1 in that comparator 164 includes an offset control input to which an offset code is applied. The offset code determines the magnitude of the voltage offset. The magnitude of the voltage offset required for a particular circuit will vary depending on the voltage level of the noise or other voltage disturbance on the signal transmission lines. Voltage comparator 164 can generate a balanced voltage (as described with respect to FIG. 1) by applying an offset code to the voltage comparator that generates a zero offset.

Figure 4:
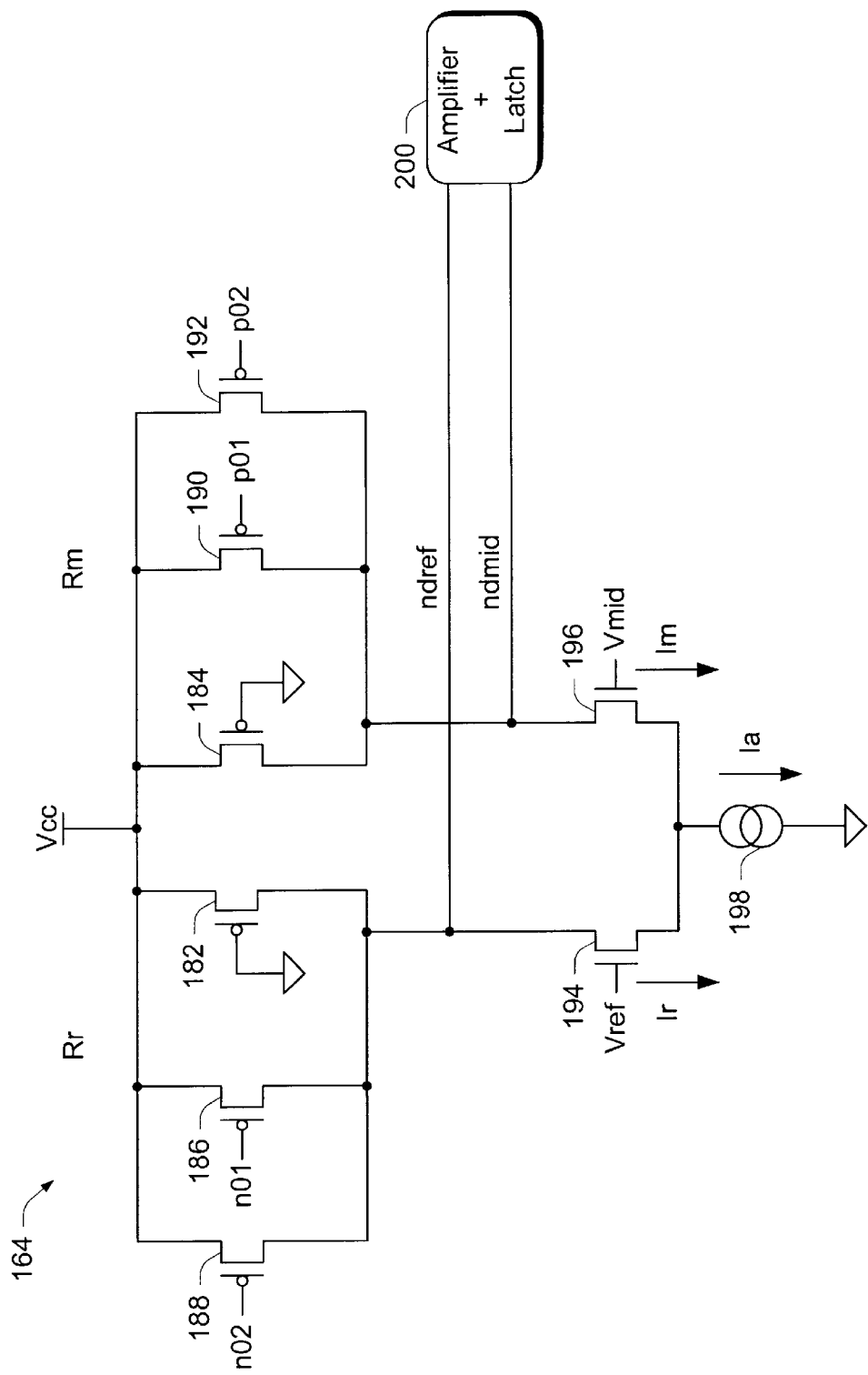
FIG. 4 illustrates an example of an offset comparator of the type shown in FIG. 3.

FIG. 4 illustrates an example of a voltage comparator having an offset control input, of the type shown in FIG. 3. A pair of transistors 182 and 184 are configured such that each transistor is always "on". Two other transistors 186 and 188 are coupled in parallel with transistor 182. The status of transistors 186 and 188 is determined by control signals n01 and n02, respectively. Similarly, two transistors 190 and 192 are coupled in parallel with transistor 184. The status of transistors 190 and 192 is determined by control signals p01 and p02, respectively. The left side of the circuit shown in FIG. 4 (i.e., transistors 182, 186, and 188) has an associated resistance Rr. The right side of the circuit shown in FIG. 4 (i.e., transistors 184, 190, and 192) has an associated resistance Rm.

A current source 198 is coupled to a pair of transistors 194 and 196 which are controlled by inputs Vref and Vmid, respectively. Transistor 194 is also coupled to an amplifier/latch 200 and transistors 182, 186, and 188. Transistor 196 is coupled to amplifier/latch 200 and transistors 184, 190, and 192. Amplifier /latch 200 is triggered at the end of the calibration cycle to latch in the result generated by the comparator. During normal operation of the circuit (i.e., when the circuit is not calibrating the voltage levels), the control state of the current mode driver will remain stable.

In a situation where no offset is required (referred to as "zero offset"), then the trigger point of the amplifier/latch 200 occurs when Vref=Vmid. In this situation, all four control signals n01, n02, p01, and p02 are high, which causes the corresponding transistors 186, 188, 190, and 192, respectively, to be turned off.

To create an offset, the resistive load of the input stage (i.e., transistors 182 - 192) is modified by activating or deactivating particular transistors. For example, if a positive offset is required, then p01 or p02 is set to low, thereby activating transistor 190 or 192. Activating transistor 190 or 192 reduces the load resistance Rm. Activating both transistors 190 and 192 further reduces the load resistance Rm, thereby providing a greater positive offset. If a negative offset is required, then n01 or n02 is set to low, thereby activating transistor 186 or 188. Activating transistor 186 or 188 reduces the load resistance Rr. Activating both transistors 186 and 188 further reduces the load resistance Rr, thereby providing a greater negative offset. Thus, various positive or negative offset values can be generated through the use of control signals n01, n02, p01, and p02.

In alternate embodiments, any number of transistors may be added to the input stage to allow adjustment of the offset. For example, three or more transistors can be provided for adjusting the positive offset and three or more transistors can be provide for adjusting the negative offset. The number of transistors provided for offset control is determined by the level of offset adjustment that may be necessary with the associated circuit.

The offset value may be adjusted (and re-adjusted) on a regular basis. For example, the signal output level is calibrated during an initialization process, which includes determining the initial offset value. Thereafter, the offset value is readjusted when, for example, a new noise source causes errors in the transmission of data. Alternatively, the offset value can be readjusted if the temperature of a component in the circuit changes enough to affect the signal quality. In other embodiments, the offset value is adjusted at periodic intervals.

Thus, improved output driver circuits have been described that allow voltages to be offset to compensate for disturbances (such as noise) on the signal transmission lines. Each of the improved circuits described herein provide asymmetric control of an output driver for purposes of calibration.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A circuit comprising:
   an offset code source configured to generate an offset code;
   a comparator having a reference voltage input, a current control voltage input, and an offset control input, the offset control input configured to receive the offset code to adjust the voltage offset on a transmission channel, wherein the offset control signal causes an imbalance on an output of output of the comparator;
   a voltage divider coupled to the current control voltage input of the comparator, the voltage divider to divide voltages associated with a first output driver and a second output driver; and
   a current control circuit coupled to the output of the comparator, wherein the current control circuit is configured to control signal levels on the transmission channel in response to an output signal received from the comparator.

2. A circuit as recited in claim 1 wherein the voltage divider includes a plurality of resistors coupled between the first output driver and the second output driver.

3. A circuit as recited in claim 1 wherein the comparator includes a plurality of transistors in an input stage.

4. A circuit as recited in claim 1 wherein the comparator includes a first plurality of transistors that are activated to establish a positive voltage offset.

5. A circuit as recited in claim 1 wherein the comparator includes a plurality of transistors that are activated to establish a negative voltage offset.

6. A circuit as recited in claim 1 wherein the comparator is further configured to establish positive voltage offset.

7. A circuit as recited in claim 1 wherein the comparator is further configured to establish negative voltage offset.

8. A circuit as recited in claim 1 wherein an offset code provided to the offset control input of the comparator identifies the voltage offset.

9. A method comprising:
   coupling a first output driver and a second output driver to a first input of a comparator;
   coupling a reference voltage to a second input of the comparator;
   providing an offset control signal to an offset control input of the comparator; and
   adjusting the offset control signal such that the offset control signal causes an imbalance on the output of the comparator.

10. A method as recited in claim 9 wherein the first output driver is in an on state and the second output driver is in an off state.

11. A method as recited in claim 9 wherein the first input of the comparator is a current control voltage input.

12. A method as recited in claim 9 wherein the offset control signal includes an offset code.

13. A circuit for controlling signal levels on a transmission channel, the circuit comprising:
   a comparator having a reference voltage input, a current control voltage input, and an offset control input configured to receive an offset code that determines a voltage offset associated with an output signal generated on an output of the comparator, wherein the offset control signal causes an imbalance on an output of the comparator;
   a current control circuit coupled to the output of the comparator, wherein the current control circuit is configured to control signal levels on the transmission channel in response to the output signal received from the comparator.

14. A circuit as recited in claim 13 wherein the comparator includes a plurality of transistors in an input stage.

15. A circuit as recited in claim 13 wherein the comparator includes:
   a first plurality of transistors that are activated to establish a positive voltage offset; and
   a second plurality of transistors that are activated to establish a negative voltage offset.

16. A circuit as recited in claim 13 wherein the comparator is configured to establish a positive voltage offset or a negative voltage offset.

17. A circuit as recited in claim 13 wherein an offset code provided to the offset control input of the comparator determines the voltage offset of the output signal generated on an output of the comparator.

18. A method comprising:
   receiving a current control voltage signal;
   receiving a voltage reference signal;
   receiving an offset signal;
   comparing the current control voltage signal and the voltage reference signal to generate a comparison output signal; and
   applying the offset signal to the comparison output signal to adjust the voltage offset on a transmission channel, wherein the offset control signal causes an imbalance on the output of the comparator.

19. A method as recited in claim 18 further comprising adjusting the offset signal in response to detection of a new noise source.

20. A method as recited in claim 18 further comprising adjusting the offset signal at periodic intervals.

21. A method as recited in claim 18 further comprising adjusting the offset signal in response to changes in temperature.

22. A method as recited in claim 18 further comprising adjusting the offset signal before applying the offset signal to the comparison output signal.

* * * * *

UNITED STATES PATENT AND TRADEMARK OFFICE
CERTIFICATE OF CORRECTION

PATENT NO.    : 6,462,588 B2
DATED         : October 8, 2002
INVENTOR(S)   : Lau et al.

It is certified that error appears in the above-identified patent and that said Letters Patent is hereby corrected as shown below:

<u>Column 6,</u>
Line 10, delete first occurrence of "output of".
Line 33, insert -- a -- between "establish" and "positive".
Line 35, insert -- a -- between "establish" and "negative".
Line 64, replace "an" with -- the --.
Line 65, insert -- and -- after "comparator;".

Signed and Sealed this

Eighteenth Day of March, 2003

JAMES E. ROGAN
*Director of the United States Patent and Trademark Office*